Aug. 9, 1966 K. ROCHLA 3,266,053
METHOD OF MANUFACTURING CARRIER BAGS OF WELDABLE MATERIAL
Filed July 23, 1963

Inventor:
KURT ROCHLA
by
Arthur O. Klein
his Attorney

United States Patent Office 3,266,053
Patented August 9, 1966

3,266,053
METHOD OF MANUFACTURING CARRIER BAGS OF WELDABLE MATERIAL
Kurt Rochla, Lengerich, Westphalia, Germany, assignor to Windmöller & Hölscher, Lengerich, Westphalia, Germany
Filed July 23, 1963, Ser. No. 296,966
Claims priority, application Germany, July 24, 1962, W 32,658
3 Claims. (Cl. 93—35)

The invention relates to a method of manufacturing carrier bags of weldable material. There are already known carrier bags of such materials, formed from a plastic hose by closing one end by welding; during this process, a pair of handles is pushed between the two layers at the open end and then attached by welding. This method is very complicated and time-wasting. Completely automatic production is either impossible, or possible only at very great expense.

The present invention has the object of eliminating the drawbacks of hitherto known methods in producing such carrier bags, and to provide a method whereby the handles may be fitted to the carrier bags already at the time of making the bag. To this purpose, a material web of two opposite layers is moved intermittently so that one longitudinal edge of these two layers is at least temporarily spaced from the long edge of the other layer, whilst a pair of handles is inserted between the two layers and connected by welding with these two layers through intermediate parts, and after one or several steps a cut is effected between two pairs of handles, preferably by means of a heated cutter, which simultaneously with cutting welds together the cut edges on each side of the cut. The invention provides a method which is considerably simpler than hitherto known methods and may be automated at comparatively little expenditure.

Conveniently the method according to the invention uses a single web in the form of a reel; this has the advantage that, where printed bags are to be made, only one side has to be printed so that a simple printing press may be used. After the printing, the web may be easily placed into the required shape.

The invention will be further described, by way of example, with reference to the accompanying drawings, in which.

Figures 1, 2:
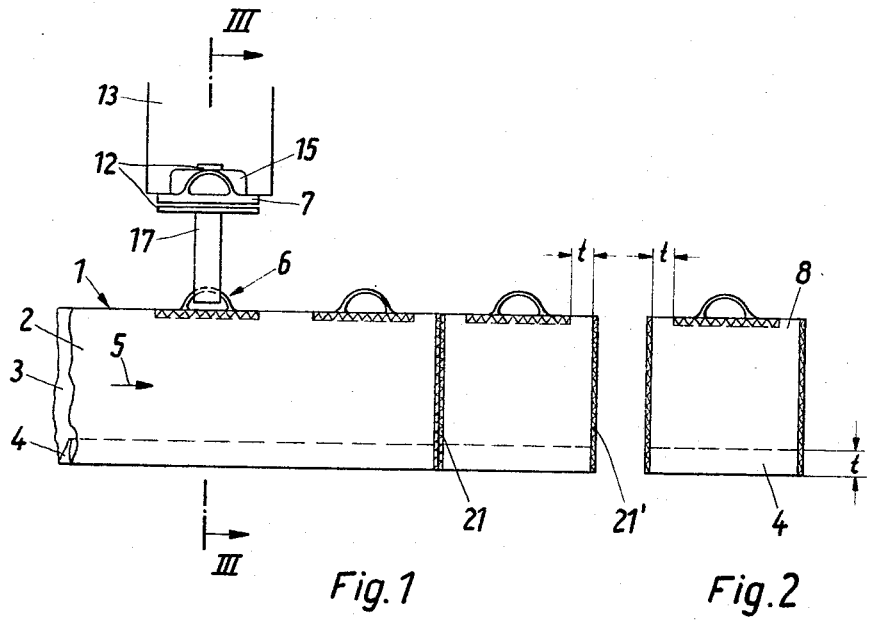
FIG. 1 shows the manufacturing stages of the carrier bag.
FIG. 2 shows the finished carrier bag in the folded condition.
Figures 3, 4:
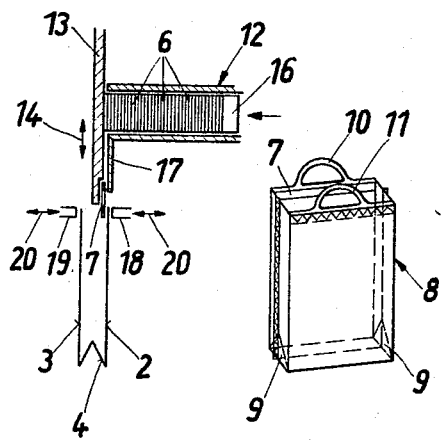
FIG. 3 is a cross-section along the line III—III in FIG. 1.
FIG. 4 shows the carrier bag in the full, expanded position.

In the embodiment shown, the two layers 2 and 3, forming the side walls of the finished carrier bag, are interconnected along one long side by a fold 4. The web 1 is intermittently advanced horizontally in the direction of the arrow 5. The layers 2, 3 are spaced one from the other along their free long edges (FIG. 3). During the stopping time of the web, a pair of handles 6, of a material which is much stronger than that of the bag, is partly pushed between the two layers and welded by the connections 7 to the layers 2, 3. Conveniently, the handles are of uniform thickness. After one or more steps a combined welding and cutting is made, normal to the direction of movement of the web 1 and centrally between two handles 6. Each such combined welding and cutting 21 separates one carrier bag from the web 1, and during this cutting process, the layers 2, 3 are welded together along the cutting edge and within the region of the fold 4 also with the same. The leading welded seam 21' of the carrier bag has already been formed during the preceding welding and separation of the neighbouring carrier bag. A finished carrier bag is shown in FIG. 2. The length of the connecting members 7 of the pairs of handles 6 is such that the two adjacent walls of the finished carrier bag 8 projects on both sides by an amount corresponding to the depth $t$ of the fold 4. This results in a convenient shape of the fully expanded bag, as shown in FIG. 4. When the carrier bag is opened out, the known triangular pockets 9 are formed at the lower end of the narrow side walls having the longitudinal welded seams.

The pairs of handles 6, comprising handles 10, 11 (FIG. 4) are supplied individually by a feeding device, and brought into contact with the web 1. The handles 10, 11 are connected one to the other, say by means of a hole and pin connection, and secured against accidental opening, and keep the carrier bag in the closed position.

The feeding device may comprise, for example, a magazine 12 in which the pairs of handles are stacked, and a slide 13, displaceable in the direction of the twin arrows 14. This possibly pneumatically operable slide 13 has on its end facing the web 1 a recess 15, the maximum depth of which corresponds to the thickness of a pair of handles 6. If the slide is moved into its rearward limit position, the lowest pair of handles 6 of the stack—which is loaded by a weight—comes to rest in the recess 15 (see FIG. 1). During the advance of the slide 13 into its forward limit position, the pair of handles is taken along (see FIG. 3) and the connecting members 7 enter between the two layers 2 and 3. The stack in the magazine rests on the slide 13 also during the movement of this slide.

Since only the handle portion of the pair of handles 6 rests in the recess 15 of the slide 13, a fixed rail 17 is provided as a guide of the handles; this rail may be of an elastic material or may have a leaf spring at its free end.

The welding of the handles 10 and 11 of a pair 6 is effected simultaneously by means of a known welding machine. Since any welder may be used, FIG. 3 shows only diagrammatically two welding jaws 18, 19, displaceable in the direction of the twin arrows 20. Also the combined welding and cutting may be carried out by a device in the art.

It is, of course, to be understood that what has been described above is applicable not only to plastic sack production but also to the production of sacks of plastic-like materials. It is, therefore, not desired to restrict the invention to the particular form of construction illustrated and described, but to cover all modifications that may fall within the scope of the appended claims.

What I claim is:

1. A method of manufacturing carrier bags of weldable material comprising the steps of intermittently moving a double-layer bag blank having at opposite sides thereof open and closed longitudinal edges, at least temporarily spacing said two layers from each other at said open longitudinal edge, inserting a pair of handles between said two layers after said two layers have been spaced from each other, welding each handle of said pair to one adjacent layer of said two layers, and combined welding and cutting in a direction normal to the direction of movement of said blank at the mid-point between two consecutive pairs of welded handles.

2. The method as claimed in claim 1, including the step wherein said double-layer bag blank is folded from a web reel of blanks into a double-layer blank, thereby providing said aforesaid bag blank having opposite open and closed longitudinal edges.

3. The method as claimed in claim 1, including the step of moving said bag blank in a horizontal plane.

References Cited by the Examiner

UNITED STATES PATENTS

| | | | |
|---|---|---|---|
| 2,221,617 | 11/1940 | Steen | 93—35 |
| 2,509,622 | 5/1950 | Woolcott | 214—8.5 |
| 2,586,514 | 2/1952 | Canno | 93—35 |
| 2,667,979 | 2/1954 | French | 214—8.5 |

BERNARD STICKNEY, *Primary Examiner.*